United States Patent [19]

Fukunaga

[11] Patent Number: 4,862,410

[45] Date of Patent: Aug. 29, 1989

[54] WORD PROCESSOR PERMITTING MODIFICATION OR ADDITION OF DATA IN RESPONSE TO PARTICULAR INDENTATION OF DATA

[75] Inventor: Koji Fukunaga, Tokyo, Japan

[73] Assignee: Canon Kabushiki Kaisha, Tokyo, Japan

[21] Appl. No.: 822,102

[22] Filed: Jan. 24, 1986

[30] Foreign Application Priority Data

Jan. 31, 1985 [JP] Japan .................................. 60-017045
Jan. 31, 1985 [JP] Japan .................................. 60-017046
Jan. 31, 1985 [JP] Japan .................................. 60-017047
Jan. 31, 1985 [JP] Japan .................................. 60-017048

[51] Int. Cl.[4] .............................................. G06F 1/00
[52] U.S. Cl. .................................... 364/900; 364/925; 364/925.6
[58] Field of Search ... 364/200 MS File, 900 MS File

[56] References Cited

U.S. PATENT DOCUMENTS 4,621,321 11/1986 Boebert et al. ..................... 364/200

*Primary Examiner*—Raulfe B. Zache
*Attorney, Agent, or Firm*—Fitzpatrick, Cella, Harper & Scinto

[57] ABSTRACT

A text processing apparatus or word processing system has an input unit for entering character data, an indentation input unit for entering indentation data, a memory for storing the character data and the indentation data, which is connected to or coupled with both the input unit and the indentation input unit, an indentation modifying unit for modifying the position of the indentation data which is stored in the memory, and a control unit for modifying the data stored in the memory according to the position of the indentation data as modified by the indentation modifying unit. This system provides for the modification of document data in response to a change in the position of indentation, the modification or editing of character data which precedes the position of indentation, and the automatic deletion of spaces, which precede an indent start position, when the identiation is released.

17 Claims, 29 Drawing Sheets

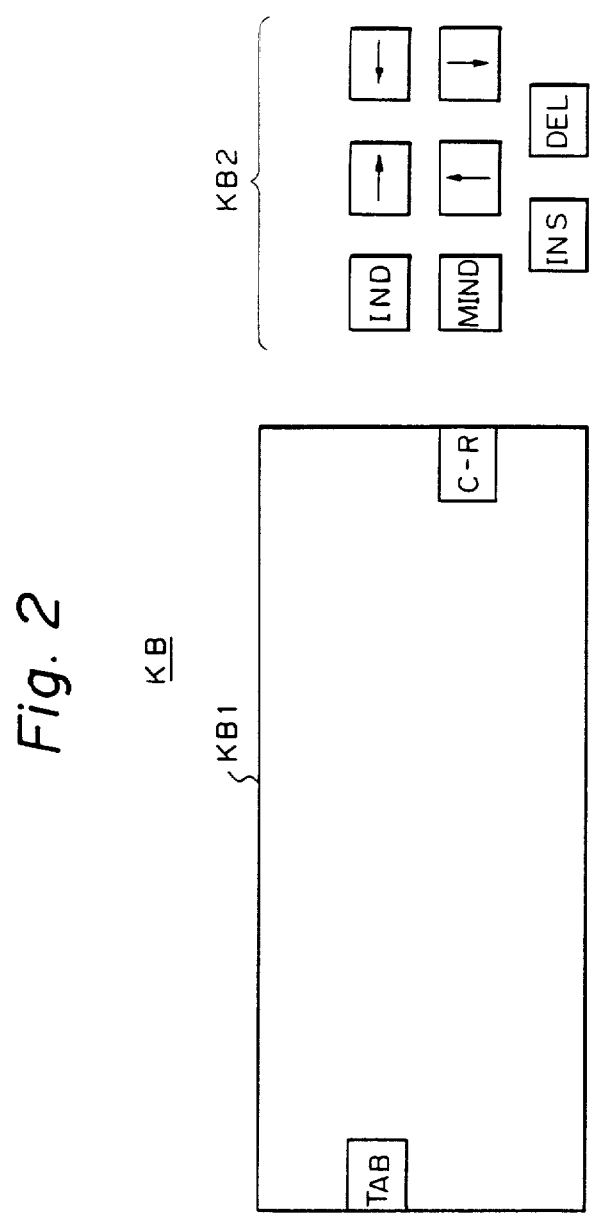

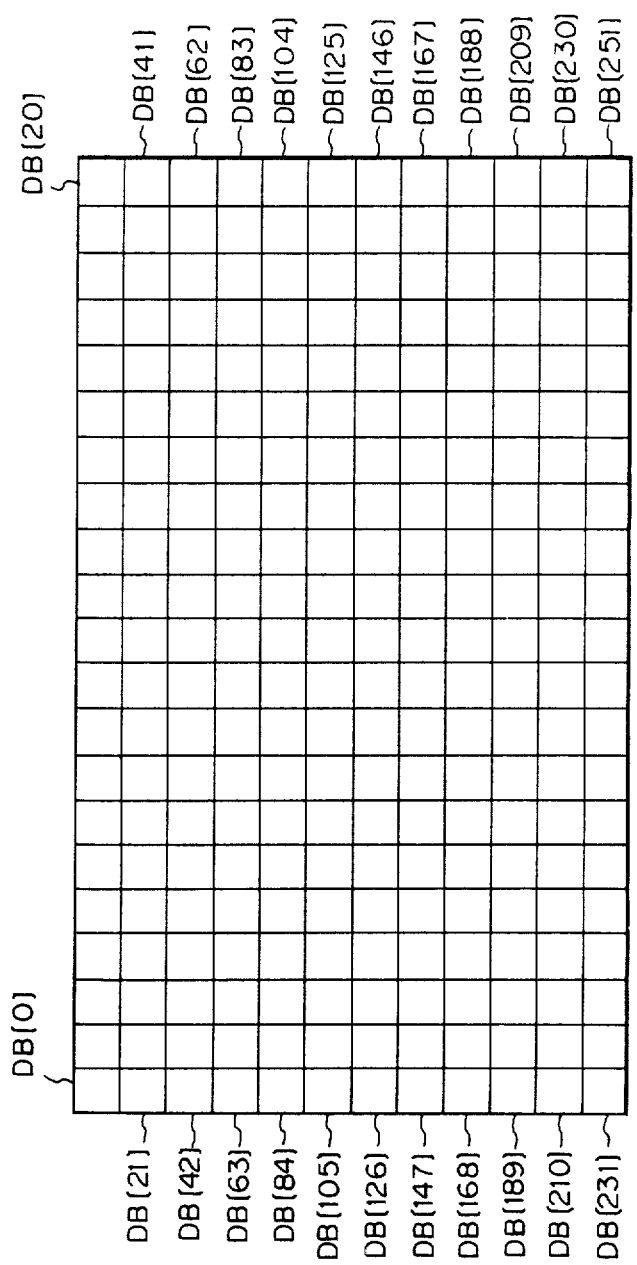

INDENT◁

(1) ᵗIndent Set◁

Cursor Move To Indent Set Posit

INDENT Ⓒᴿ (1) ⓘⓒ1 0 Ⓒ

Indent Set Ⓒᴿ Cursor Mov e To Indent Set Posit

INDENT◁ (1) ☐

Fig. 8B (1)

INDENT (CR) ☐

Fig. 8C (1)

INDENT◁ (1) ☐

Fig. 8D (1)

INDENT (CR) i c 1 o c
(eof)

Fig. 9

INDENT▽
—

⌐Indent Set▽
Cursor Move To Indent Set Position▽.
And Press Indent Set Key[IND].▽

⌐Indent Release▽
Cursor Move To Indent Start Mark "⊢" Position.▽
And Press Indent Modify Key[MIND].▽

INDENT▽
(1.1.10) ⌐Indent Set▽
Cursor Move To Indent Set Position.▽
And Press Indent Set Key[IND1].▽
▽
(1.1.11) ⌐Indent Release▽
Cursor Move To Indent Start Mark" Position.▽
And Press Indent Modify Key[MIND1].▽
□

```
INDENT▽
  ⌐Indent Set▽
    Cursor Move To Indent Set Position.▽
    And Press Indent Set Key[IND].▽
  ⌐Indent Release▽
    Cursor Move To Indent Start Mark' Position.▽
    And Press Indent Modify Key[MIN D].▽
 ▽
                                    □
```

*Fig. 14*

```
INDENT▽
 (1)  Indent Set▽
Cursor Move To Indent Set Position.▽
And Press Indent Set Key[IND1.▽
▽
 (2)  "Indent Release▽
Cursor Move To Indent Start Mar
k" Position.▽
And Press Indent Modify Key[MIN
D1.▽
```

Fig. 15

```
INDENT(CR)
Set Cursor(CR) to Indent
Indent Press(CR)            (1) Move to Indent
And Press LIND1.(CR)        (2) Set Cursor
Key[IND1(c)                 Release Indent
         Cursor Move to Mark',
         Start Mark', Indent Position
         . And Press(CR)    Indent 1.(CR)(i)(eof)
Modify Key[MIND1.
```

Fig. 16

```
INDENT▽
Indent Set▽
Cursor Move To Indent Set Position▽
And Press Indent Set Key[IND].▽
▽
 ⌐Indent Release▽
  Cursor Move To Indent Start Mar
  k'r' Position.▽
  And Press Indent Modify Key[MIN
  D].▽
```

INDENT▽
(1) ┌Indent Set▽
    Cursor Move To Indent Set
    Position.▽
    And Press Indent Set Key [
    IND].▽
▽
(2) ┌Indent Release▽
    Cursor Move To Indent Start Mar
    k┐┘ Position.▽
    And Press Indent Modify Key[MIN
    D].▽

Fig. 19

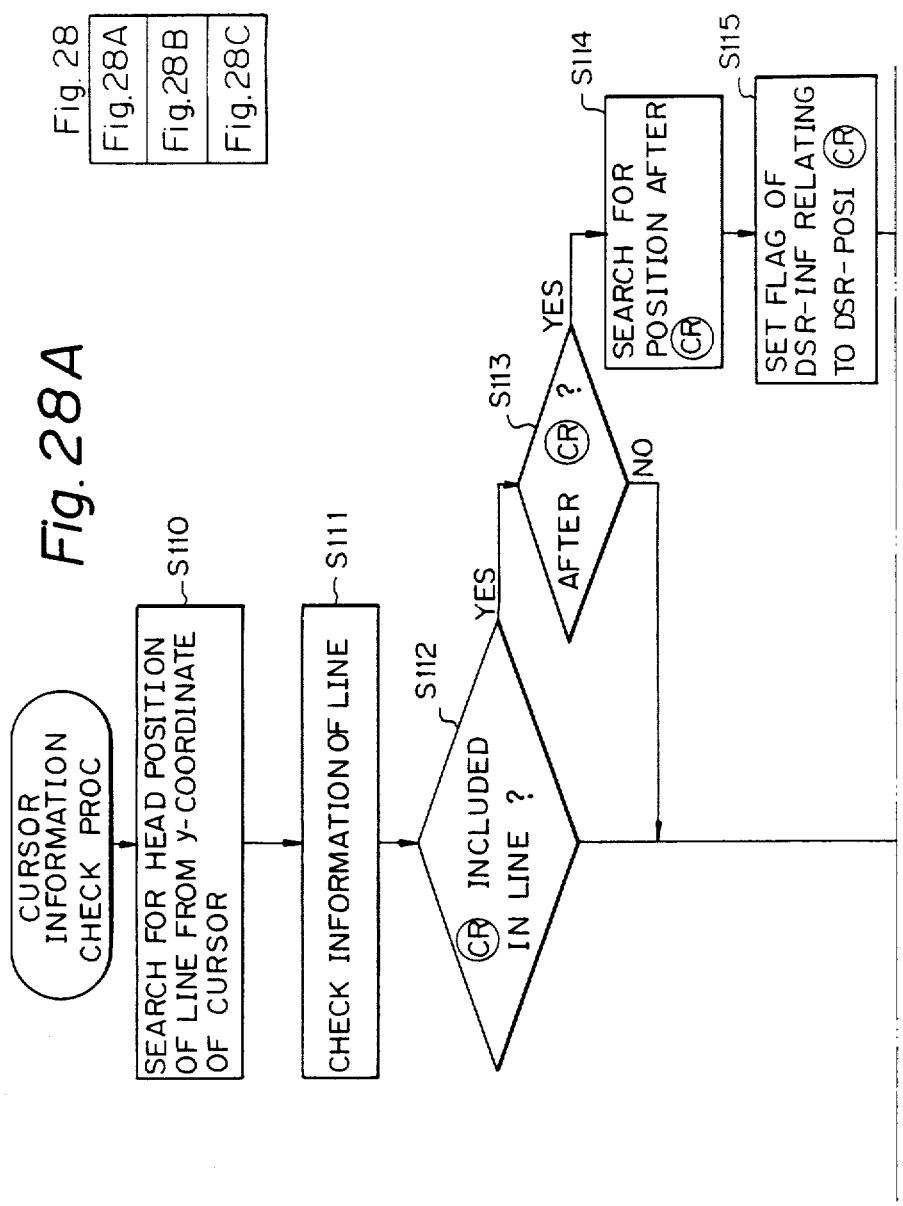

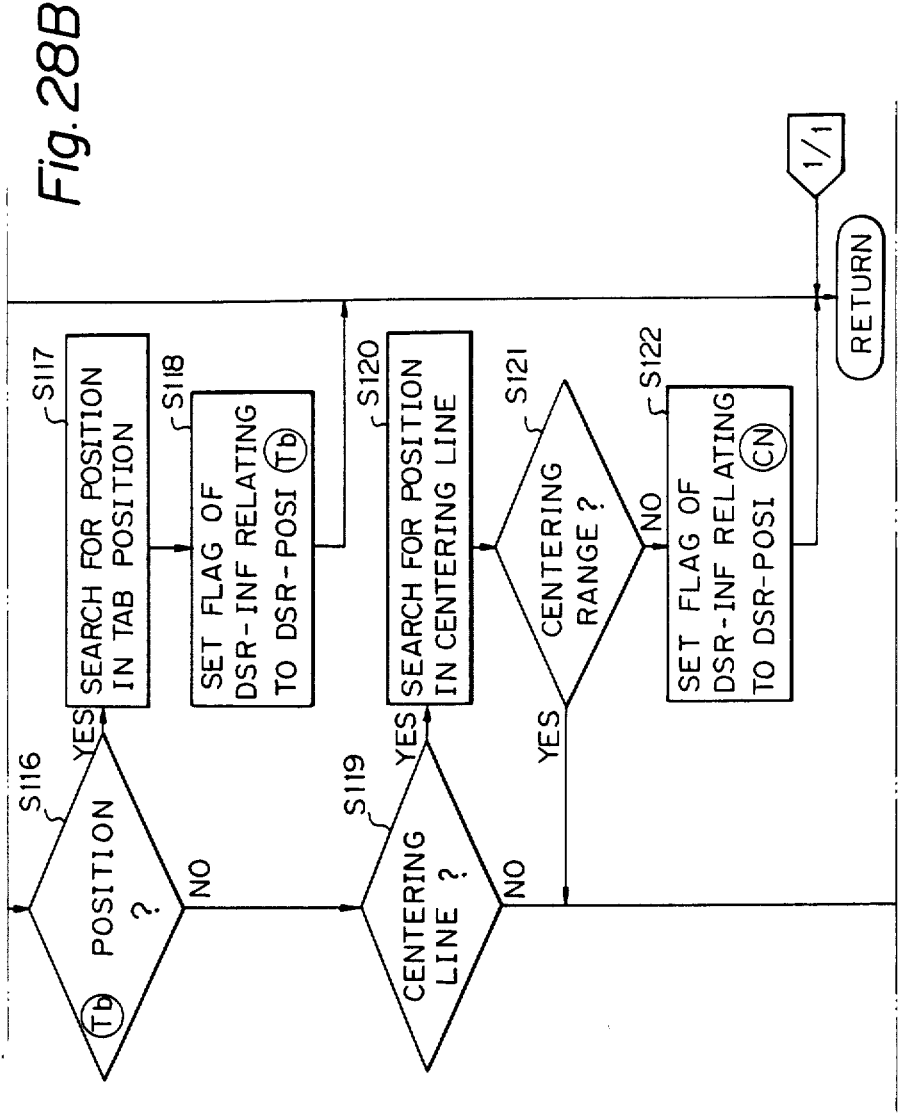

WORD PROCESSOR PERMITTING MODIFICATION OR ADDITION OF DATA IN RESPONSE TO PARTICULAR INDENTATION OF DATA

BACKGROUND OF THE INVENTION

1. Field of the Invention

The present invention relates to a word processor with highly advanced editing functions, and to a word processor capable of various processings such the inputting and editing of, and their display on a display screen.

2. Description of the Prior Art

There are recently commercialized various apparatus with highly advanced word processing functions, but such highly advanced functions give rise to certain drawbacks.

For example, when entering characters with an indentation, which functions as a temporary margin setting for aligning the lines of characters, there will result two mutually contradicting drawbacks. The first of such drawbacks is encountered in a word processor in which characters can be freely entered to the left of the position of indentation setting, i.e., between said position and the position of left margin. In order to enable entry of characters to the left of the position of indentation, a space for such entry has to be secured with a space key before character entry. For this reason, apart from the entered characters, a code for aligning the indent positions is set in a buffer memory either automatically or by an operator with a tabulator key or a space key. Because of the presence of such code in the buffer memory, separate from the entered characters, it has been not easy to cancel the indentation or alter the position thereof afterwards, and such works have been quite cumbersome for the operator. In order to avoid the first drawback explained above, disabling the entry of characters to the left of the position of indentation and aligning the characters at said position on the display has been suggested. However, such method of disabling the character input at the left of the position of indentation eliminates the advantage of character entry to the left of the position of indentation. As explained above, there has not been an apparatus which can easily modify or correct editing functions, such as indentation, and still allows easy input of ordinary documents.

SUMMARY OF THE INVENTION

An object of the present invention is to provide a word processor which allows modification of document data in response to a change in the position of indentation.

Another object of the present invention is to provide a word processor which allows the modifying or editing of character data, which is located in a position preceding the position of indentation.

Still another object of the present invention is to provide a word processor which deletes a space in an area preceding the position of indentation when indentation data are deleted.

Still another object of the present invention is to provide a word processor in which the deletion of one of a pair of special data deletes the other.

Still another object of the present invention is to provide a word processor in which, once an indentation is instructed, the start positions of following lines are aligned to the column of said indentation on the display.

Still another object of the present invention is to provide a word processor in which, once an indentation is instructed, following lines are not affected even if correction or editing is made in a line in which said indentation is instructed.

BRIEF DESCRIPTION OF THE DRAWINGS

FIG. 2 is a plan view showing a detailed example of a keyboard KB shown in FIG. 1;

FIG. 3 is a schematic view showing an example of a buffer memory DB shown in FIG. 1;

FIG. 7 is a view showing the content of the buffer memory DB corresponding to the display shown in FIG. 6;

FIG. 8A is a view showing a state of the display prior to the input of indentation data which is shown in FIG. 6;

FIG. 8B is a view showing a part of the buffer memory DB which corresponds to the state shown in FIG. 8A;

FIG. 8C is a view showing a state in which the IND key, illustrated in FIG. 2, is depressed, at the cursor position shown in FIG. 8A, to start character input with indentation;

FIG. 8D is a view showing a part of the buffer memory DB which corresponds to the state shown in FIG. 8C;

FIG. 8E is a view showing an example of character inputs in the range of indentation;

FIG. 8F is a view showing a part of the buffer memory DB which corresponds to the state shown in FIG. 8E;

FIG. 9 is a view showing examples of character input and editing in a first indented line;

FIG. 10 is a chart showing the content of the buffer memory corresponding to FIG. 9;

FIG. 11 is a view showing an example in which the indent column position is exceeded;

FIG. 12 is a view showing the content of the buffer memory corresponding to FIG. 11;

FIG. 13 is a view showing an example in which a first indented line is edited to a column smaller than an indent column position;

FIG. 14 is a view showing the state after the cancellation of indentation;

FIG. 15 is a view showing the content of the buffer memory corresponding to FIG. 14;

FIG. 16 is a schematic view showing the cancellation of indentation when the indent position is not preceded by characters;

FIG. 17 is a view showing the content of the buffer memory corresponding to FIG. 16;

FIG. 18 is a view showing the state after a modification in indentation;

FIG. 19 is a view showing the content of the buffer memory corresponding to FIG. 18;

FIG. 27 shows how

FIG. 28 shows how FIGS. 28A, 28B, and 28C are assembled to form a flow chart showing a cursor information checking process.

DETAILED DESCRIPTION OF THE PREFERRED EMBODIMENTS

In the following the present invention will be clarified in greater detail by embodiments thereof shown in the attached drawings.

Figure 1:
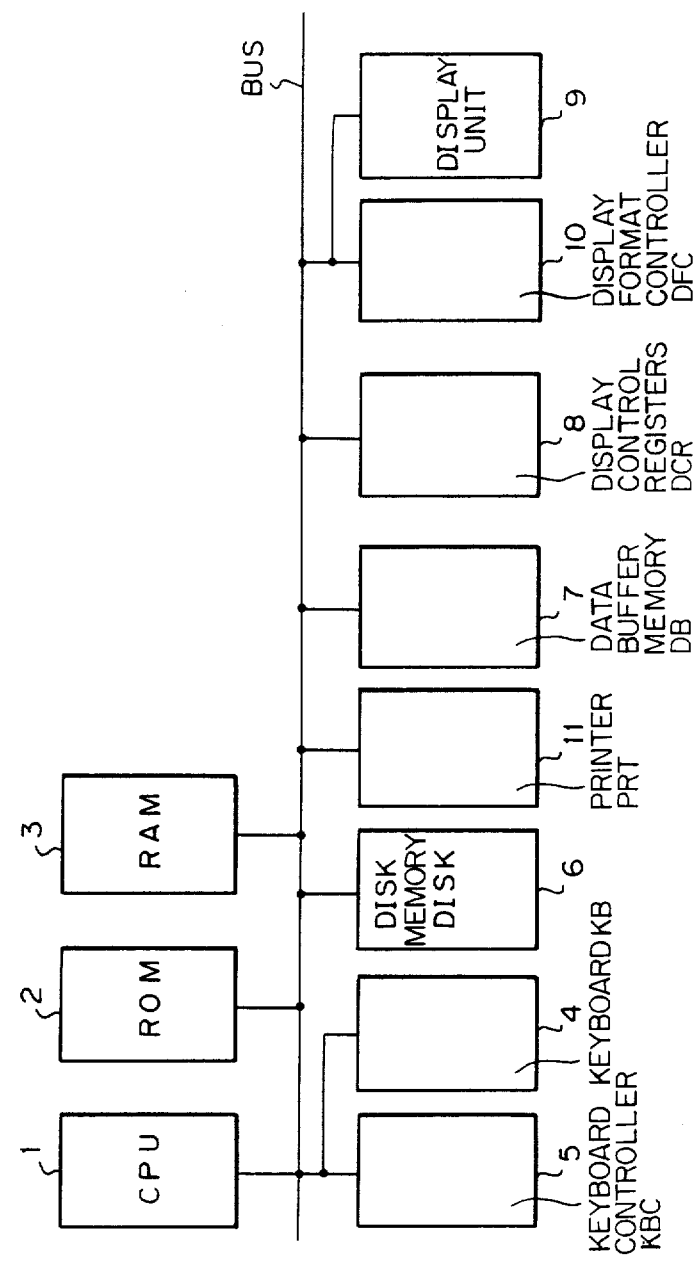
FIG. 1 is a block diagram of an embodiment of the word processor of the present invention.

FIG. 1 shows an embodiment of the structure of the word processor of the present invention, wherein a central processing unit (CPU) 1 is composed of a microprocessor which performs calculations and logic discriminations for word processing and controls, through a bus BUS, various components connected to said bus as will be explained later. In the following description, document information is to be understood to include image information. Said BUS collectively includes an address bus for transmitting address signals, a control bus for transmitting control signals, and a data bus for transmitting various data.

A read-only memory (ROM) 2, employed as a control memory, stores the control procedures shown in FIGS. 20 to 28 and those of character input, display process, editing process etc., to be executed by the microprocessor CPU 1. A random access memory (RAM) 3 is employed in the execution of the procedures stored in the ROM 2, for temporary storage of various data from the components and as a work memory in the calculation and logic processing of the microprocessor 1. A keyboard (KB) 4 for entering characters is provided with various keys for instructing the CPU 1 as shown in FIG. 2. A keyboard controller (KBC) 5 performs key code conversions to the input signals from the keyboard 4.

Figure 5:
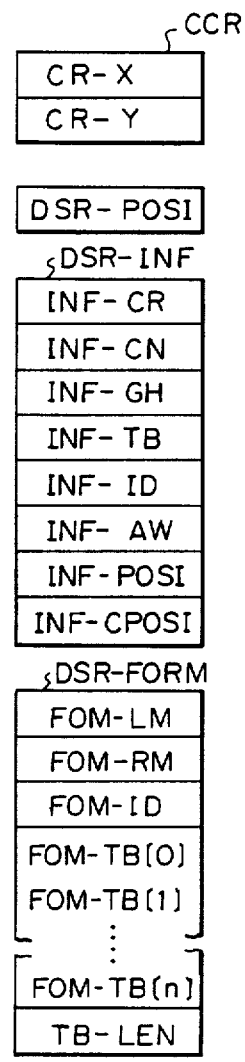
FIG. 5 is a view showing the details thereof.
Figure 4:
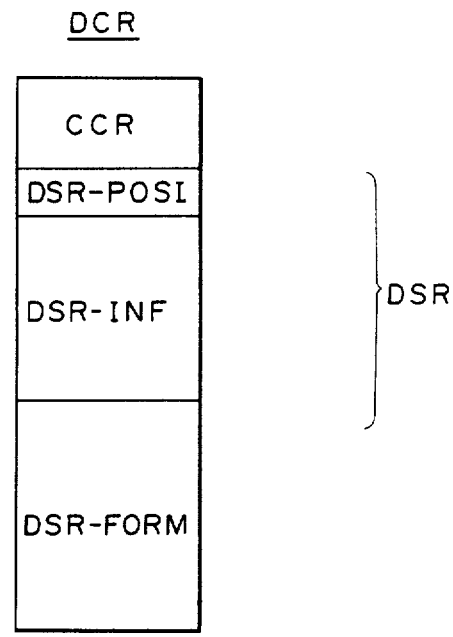
FIG. 4 is a schematic view showing an example of display control registers DCR shown in FIG. 1.

A disk memory (DISK) 6 is employed for storing and fetching the prepared or edited documents. A data buffer memory (DB) 7, for document preparation and editing, stores the key codes entered from the keyboard 4 in the form of character codes. As shown in FIG. 3, the buffer memory 7 of the present embodiment has a memory area of 252 characters, numbered from DB[0] to DB[251]. Display control registers (DCR) 8 include, as shown in FIGS. 4 and 5, a cursor control register (CCR), buffer position display registers (DSR-POSI), cursor position display registers (DSR-INF), and format display registers (DSR-FORM).

A display unit 9, composed, for example, of a cathode ray tube, a liquid crystal display device or light-emitting diodes, displays characters entered from the keyboard 4 and corrected or edited sentences, and display the position of character processing with a cursor. A display format controller (DFC) 10, driving the display device 9, controls the positioning of characters on the screen with a cursor and the display of characters and symbols with dot patterns through the use of an internal character generator. A printer (PRT) 11 prints the sentences prepared or edited on the display screen.

FIG. 2 shows an example of an arrangement of the keyboard 4 shown in FIG. 1, wherein character keys KB1 for entering ordinary characters, numerals and symbols, hereinafter called ordinary keys, are arranged, for example, according to the Japanese Industrial Standard, but they will not be explained in detail as they are not directly related to the present invention. A carriage return key CR is included in said keys KB1.

Functional keys KB2, for instructing execution of special tasks such as the movement of the cursor, hereinafter called special keys, include an insertion key INS for inserting a character; a deletion key DEL for deleting a character; four cursor moving keys "↑, ↓, ←, →", which are used for moving the cursor by a character pitch in directions indicated by the arrows; a key IND for setting or ending an indentation; and a key MIND for releasing or modifying an already set indentation.

In the present embodiment, it is assumed that a text was already prepared by the actuations of the keys KB1, KB2 and stored in the buffer memory 7 for text preparation and editing. The functions of said function keys KB2 will not be explained in detail as they are generally already known.

FIG. 3 shows an example of the structure of the buffer memory DB (7) shown in FIG. 1. Said memory has 252 character memory areas, each for one character, addressed from [0] to [251], in which DB [0] represents a head position and DB [251] represents an end position.

FIG. 4 is a schematic view of the display control registers DCR shown in FIG. 1, and FIG. 5 shows a more detailed structure thereof. As shown in FIG. 4, the display control registers DCR are mainly divided into a cursor control register CCR and display registers DSR. The cursor control register CCR indicates the x- and y-coordinates of the cursor on the display screen. As shown in FIG. 5, the x-coordinate is indicated in a range from "0" to "39" by an x-register CR-X, and the y-coordinate is indicated in a range from "0" to "11" by a y-register CR-Y.

As shown in FIG. 4, the display registers DSR consists of a buffer-cursor position register DSR-POSI, cursor position display registers DSR-INF, and format information registers DSR-FORM. The buffer-cursor position register DSR-POSI indicates a position in the buffer memory DB, corresponding to the cursor position on the display screen indicated by the above-mentioned registers CR-X and CR-Y, by an address number allotted to each memory area of the buffer memory DB.

The cursor position display registers DSR-INF indicates the aberration between the actual cursor position on the display screen and the corresponding position in the buffer memory DB, and are composed, as shown in FIG. 5, of registers INF-CR - INF-AW indicating the position status of cursor on the screen and registers INF-POSI and INF-CPOSI indicating the cursor status in positions not present in the buffer memory DB. The register INF-POSI indicates the cursor position not present in the buffer memory DB by indicating the amount of aberration from the cursor position of the buffer memory DB, which is indicated by the register DSR-POSI, and the register INF-CPOSI indicates the amount of aberration between a centering code CN and the left margin position. Table 1 shows the contents of the above-explained registers INF-CR - INF-TB, wherein numbers represent the values of flags of said registers.

TABLE 1

| Register DSR-INF | 0 | 1 | 2 | 3 |
|---|---|---|---|---|
| Register INF-CR (indicating relation of carriage return position and cursor position) | Cursor positioned at or to the left of carriage return position | Cursor positioned to the right of carriage return position | | |
| Register INF-CF (indicating relation of centering position and cursor position) | | Cursor at centering position | Cursor to the left of centering position | Cursor to the right of centering position |
| Register INF-GH (indicating relation of gathering position and cursor position) | | Cursor at gathering position | Cursor to the left of gathering position | |
| Register INF-TB (indicating relation of tab position and cursor position | Cursor not at tab position | Cursor at tab position | | |

The format information registers DSR-FORM store display format information, and, as shown in FIG. 5, are composed of a register FOM-LM for setting the left margin position; a register FOM-RM for setting the right margin position; a register FOM-ID for settling the indent position; registers FOM-TB[0] to FORM-TB[n] (n being a positive integer) for storing designated tabulator positions; and a register TB-LEN for indicating the number of characters between a tabulator position and a preceding character other than a space. In the present explanation, it is assumed that the contents of the registers FOM-LM, FOM-RM and FOM-ID are respectively "0", "39" and "0". The tabulator position registers FOM-TB[0] - FOM-TB[n] respectively store the addresses of tabulator positions in an increasing order.

Figure 6:
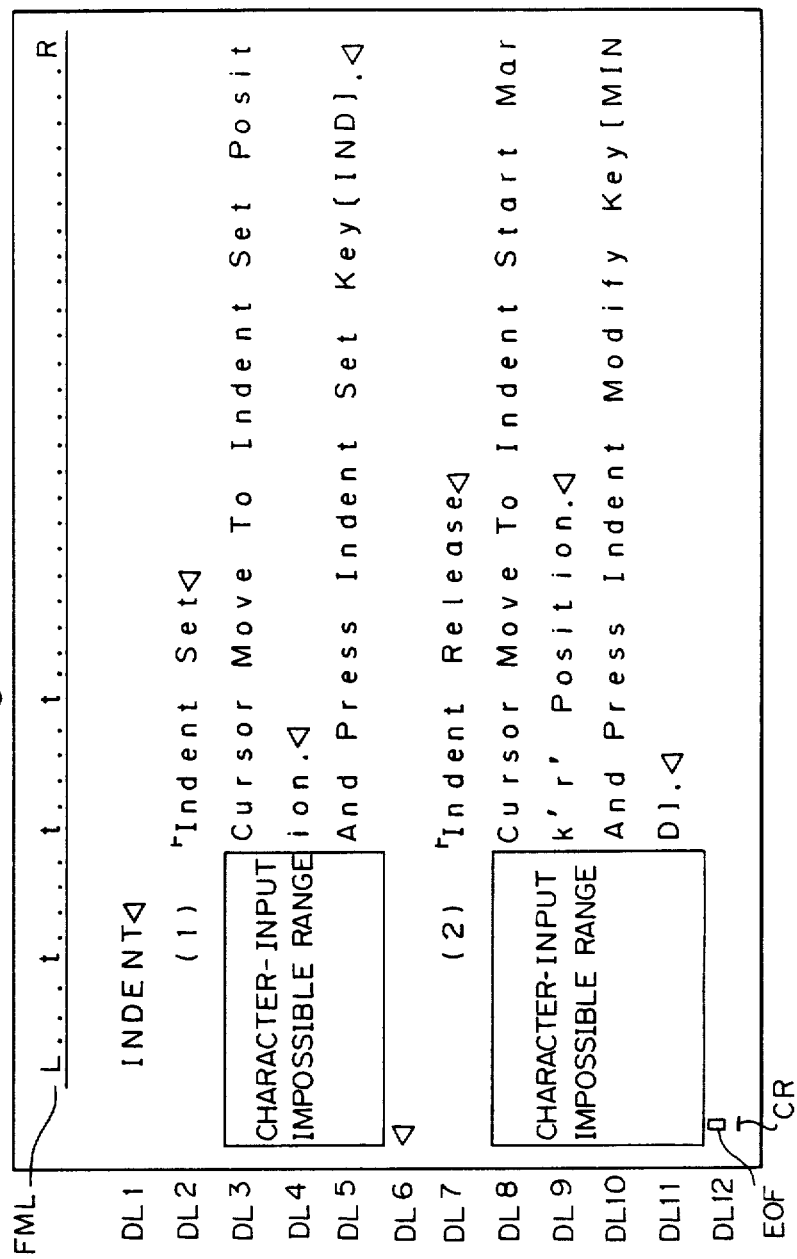
FIG. 6 is a view showing an example of display of a document.

FIG. 6 shows an example of a display, on the display unit CRT shown in FIG. 1, of a text entered from the keyboard KB, wherein a format line FML, indicating the format on the display screen, shows the margin and tabulator positions. There are indicated a left margin position "L", a right margin position "R", tabulator positions "t", and character input positions ".". In the illustrated example, the left margin position is at "0", the right margin position is at "39", and the tabulator positions are at "4", "9" and "14". Twelve lines DL1–DL12, below the format line FML represent the display area for text.

Figure 7:
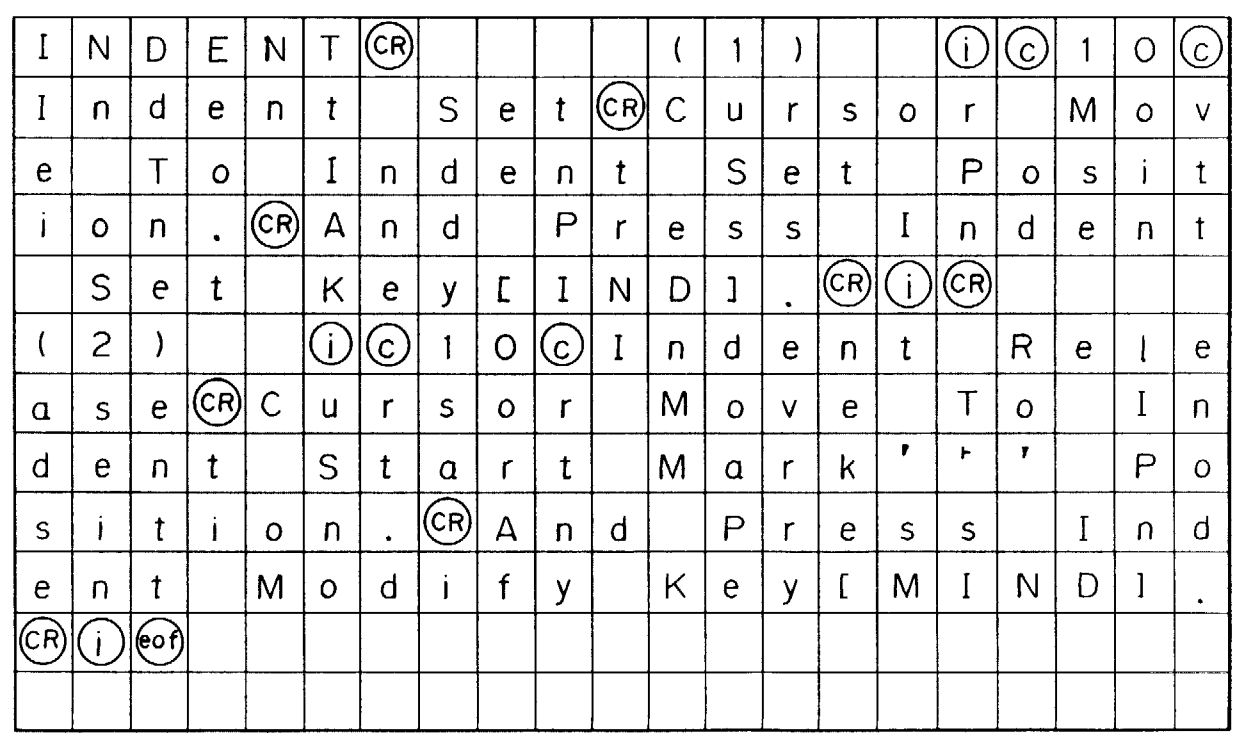

The cursor CR is displayed "—". The value of the register CR-X, indicating the x-coordinate of the cursor CR, is equal to "0" or "39" respectively at the left or right margin position, and the value of the register CR-Y indicating the y-coordinate is equal to "0" or "12" respectively at the first line DL1 or the last line DL12. In this manner, the cursor can be moved by the cursor moving keys in an area of (0, 0) - (39, 11). A special code "☐" EOF (end of file) indicates the final input position of characters. In the actual apparatus this position may not be visible to the operator. If a character is entered in a position of the buffer DB corresponding to said EOF position when the cursor is at said position, the EOF position is moved one step backward in the buffer. A mark " ㅏ " represents the start position of indentation and is displayed together with a start character of indentation. Said mark may be replaced, for example, by " ▲ ". The example shown in FIG. 6 has two areas of indentation DL2–DL5 and DL7–DL11, with character input impossible ranges DL3–DL5 and DL8–DL11. In these areas, any character input is disregarded and is not set in the buffer. FIG. 7 shows an example of data storage in the buffer memory DB corresponding to the display shown in FIG. 6.

As shown in FIG. 7, the displayed characters are consecutively stored in the buffer memory DB, which also stores special codes [CR], [i], [c] and [eof]. The code [CR] indicates a carriage return, and following characters are displayed in a next line. The code [i] indicates the range of indentation in the buffer memory DB, and an indent process is applied to a range between [i] and [i]. The code [c] indicates the column position of indent setting, and a number of columns is stored between the codes [c] and [c]. For example, [c] 10 [c] indicates that the indent setting position " " is at the 10th column from the left margin position. Thus, the characters in the range of indentation, between [i] and [i], are displayed and printed, except in the first line of indentation, starting from the 10th column.

FIG. 8A shows a state prior to the input of indentation in the example shown in FIG. 6, wherein the input has proceeded to the start position of first indent preparation. FIG. 8B shows a part of the buffer memory DB in this state.

FIG. 8C shows a state in which the IND key shown in FIG. 2 is depressed, at the cursor position shown in FIG. 8A, to start character input with indentation, whereby the mark " ㅏ " indicates the start position with indentation. FIG. 8D shows the content of the buffer memory DB, wherein, in response to the actuation of the IND key, an indentation code [i] and a number "10" indicating the number of columns of indentation, sandwiched between codes [c] are entered at the end-of-file position and the code [eof] is pushed back to a next line. Thereafter the character inputs are effected under the indented condition until the IND key is actuated again. FIG. 8E shows an example of character inputs in the range of indentation, from the position of [eof] shown in the buffer memory in FIG. 8D, and FIG. 8F shows the corresponding state of the buffer memory.

In this manner, the input is conducted with indentation in the order of FIGS 8A, 8C and 8E.

Figure 10:
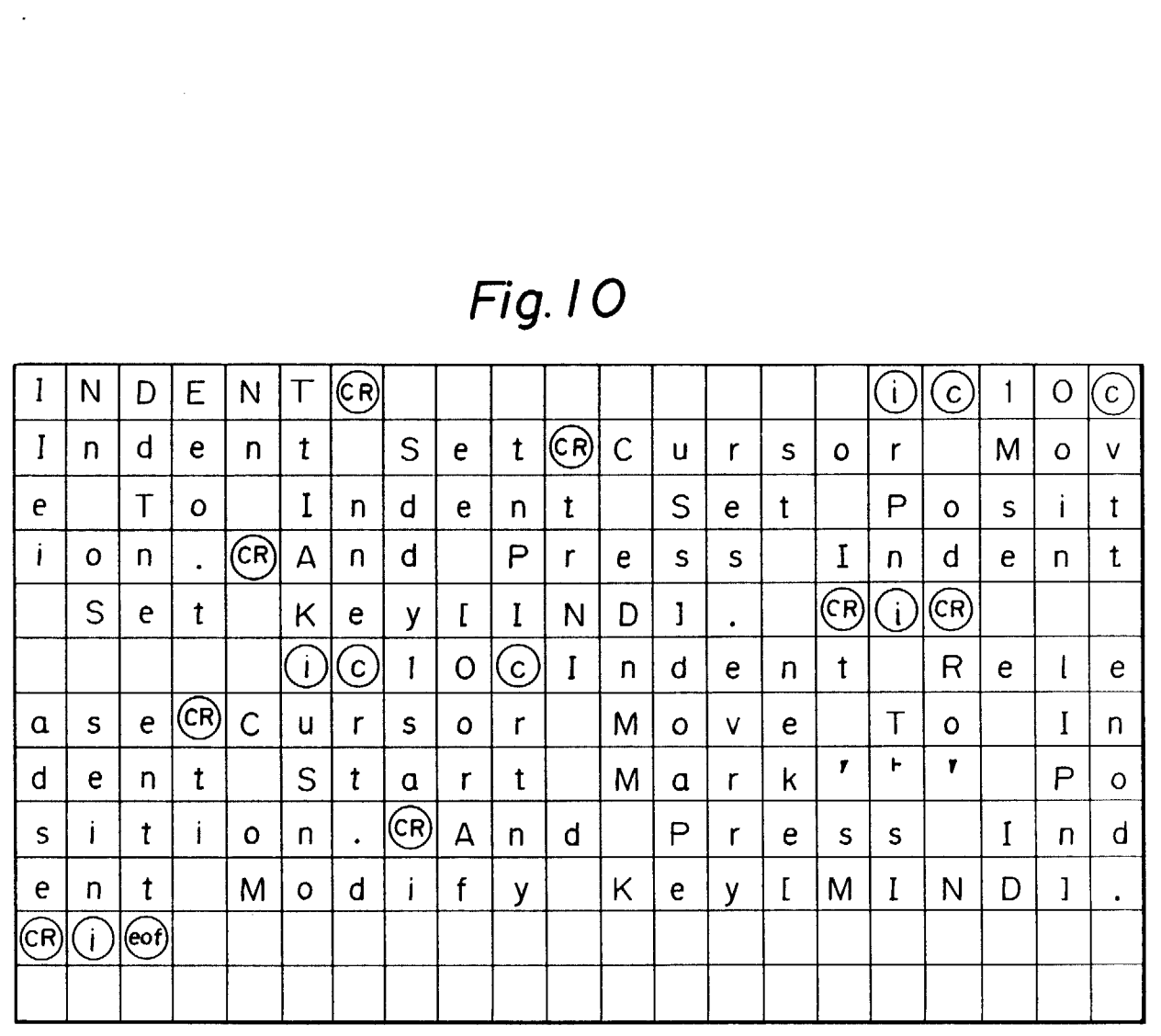

FIG. 9 shows an example of character input and editing in the indentation start line, wherein characters are entered only before the indent setting position, marked by " ⊢ ". This state can also be reached by actuating the space key, in the example shown in FIG. 6, at the displayed position of "(1)" and "(2)". FIG. 10 shows the state of the buffer memory corresponding to FIG. 9.

Figure 12:
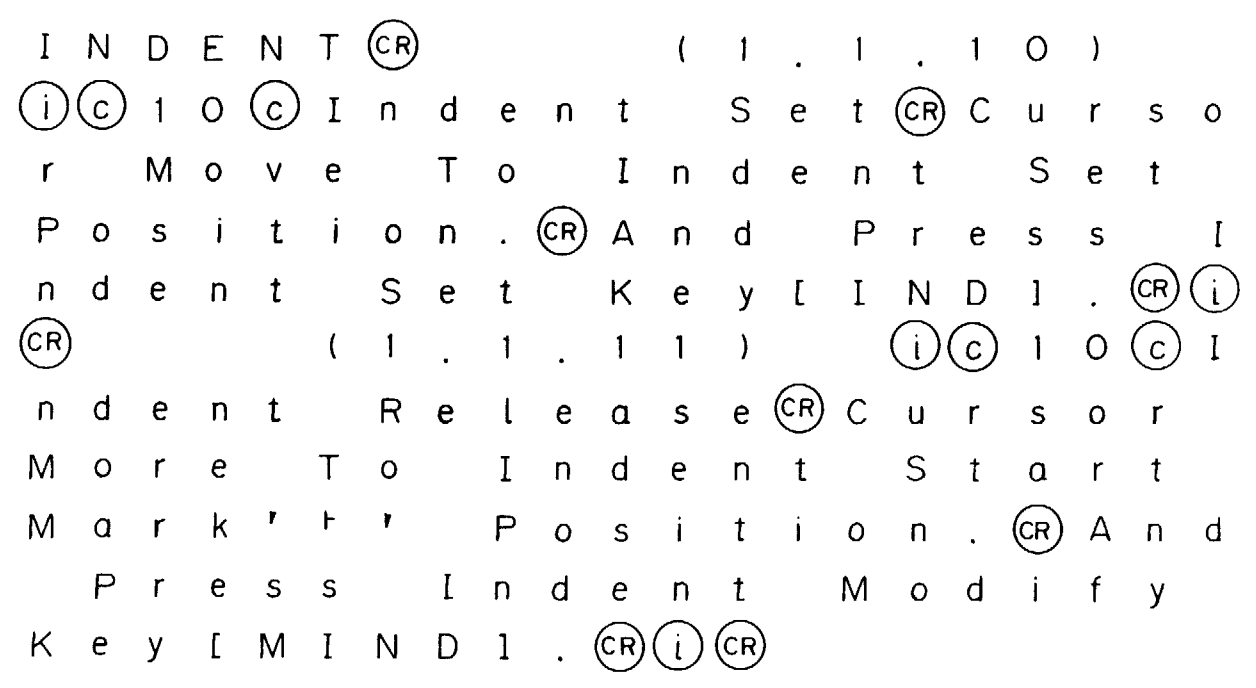

FIG. 11 shows an example of editing in the indentation state line, wherein "(1)" is amended to "(1.1.10)". This amendment is achieved, in an already prepared text as shown in FIG. 6, with the insertion key and ordinary keys. FIG. 11 indicates that, only in the indentation start line, the input of characters is rendered possible beyond the indent column position, which is at the 10th column in the illustrated example. This editing is achieved with the insertion key, and in the indentation start line there can be freely entered a title word containing characters of a number exceeding the indent setting column position (a title (1.1.10) in the present example). FIG. 12 shows the corresponding state of the buffer memory.

On the other hand, FIG. 13 shows an example in which the indentation start line is edited to a column position smaller than the indent column position. In FIG. 13, the indentation start line starts from the 5th column, which is smaller than the indent start position at the 10th column.

The state of this example can be realized, from the state shown in FIG. 9, by deleting spaces preceding the indent start position with the deletion key. The corresponding state of the buffer memory is same as that shown in FIG. 12.

FIG. 14 shows a state after the indentation is released, which is achieved by moving the cursor to the indent start position (" ⊢ ") shown in FIG. 6 and depressing the MIND key. In this case the characters displayed in the lines DL3, DL4 and DL5 shown in FIG. 6 are moved to start from the left margin position. FIG. 15 shows the corresponding state of buffer memory, wherein the initial codes [i] [c]10 [c] [i] present in FIG. 7 are removed to release the indentation, whereby the display is changed to the ordinary state starting from the left margin position. The characters in the buffer memory remain unchanged except for the deletion of special codes.

FIG. 16 shows another example of indent release from the example of FIG. 9, in which no characters are present in front of the indent start position. In such case, all the spaces preceding the indent start position have been deleted. If no characters are present, except spaces, in front of the indent start position as shown in FIG. 9 and no particular input is required, such spaces are automatically deleted.

Figure 17:
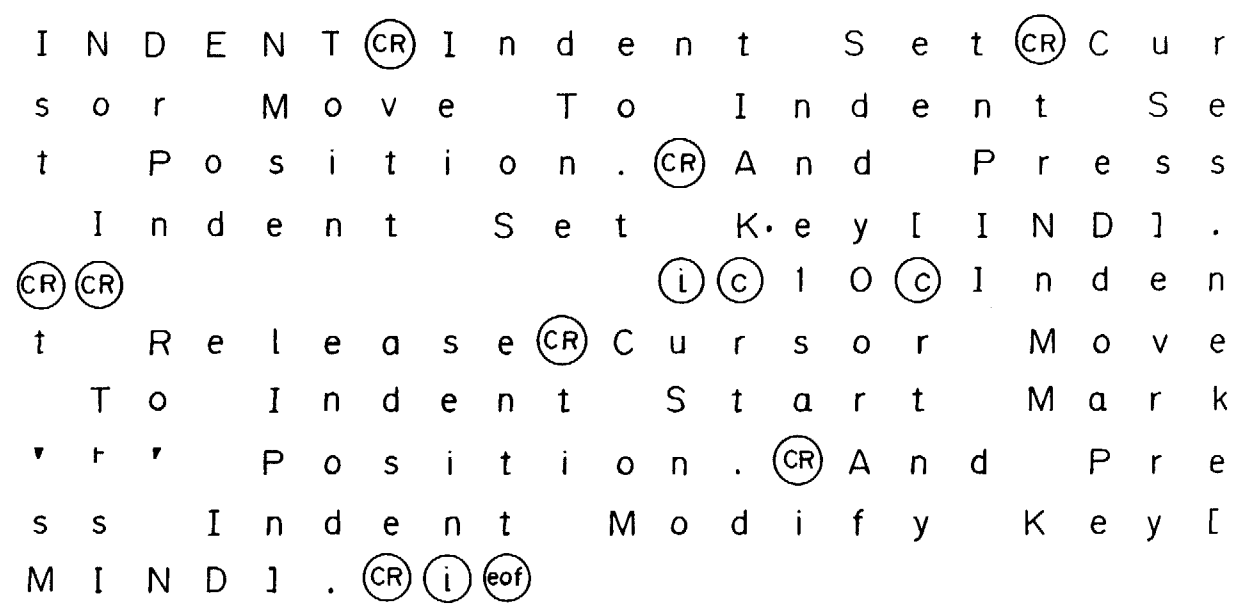

Spaces preceding the indent start position are required when indentation is instructed, but such preceding spaces become unnecessary when the indentation is released. In the present embodiment, therefore, such spaces are automatically deleted after the absence of other characters is discriminated. However, such deletion is not effected if any character, other than space, is present preceding the indent start position. FIG. 17 shows the state of the buffer memory corresponding to FIG. 16, wherein all the spaces preceding the indent start position have been deleted to cancel the indentation without affecting the second indentation.

Figure 19:
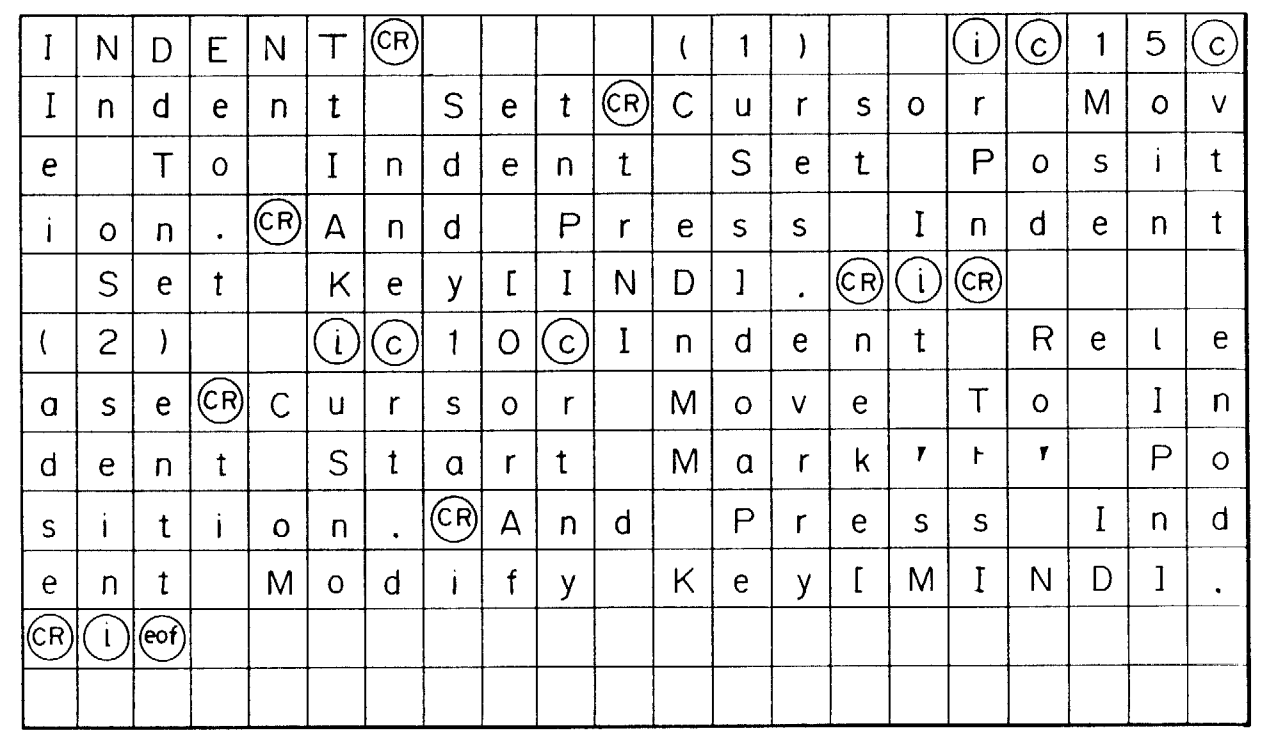

FIG. 18 shows a state after a change of the indent start position. Said change is achieved by moving the cursor to a new column position in the range of indentation and depressing the MIND key, shown in FIG. 2, which allows the release or modification of the already set indentation. In the example shown in FIG. 18, the cursor is moved to a new indent start position at the 15th column and the MIND key is depressed. FIG. 19 shows the corresponding state of the buffer memory, wherein the codes [c]10 [c] have been changed to [c]15 [c]. In this manner the indent start column position can be easily changed.

In the following description, reference is made to flow charts shown in FIGS. 20 to 28 for further clarifying the functions of the apparatus of the present invention.

Figure 20:
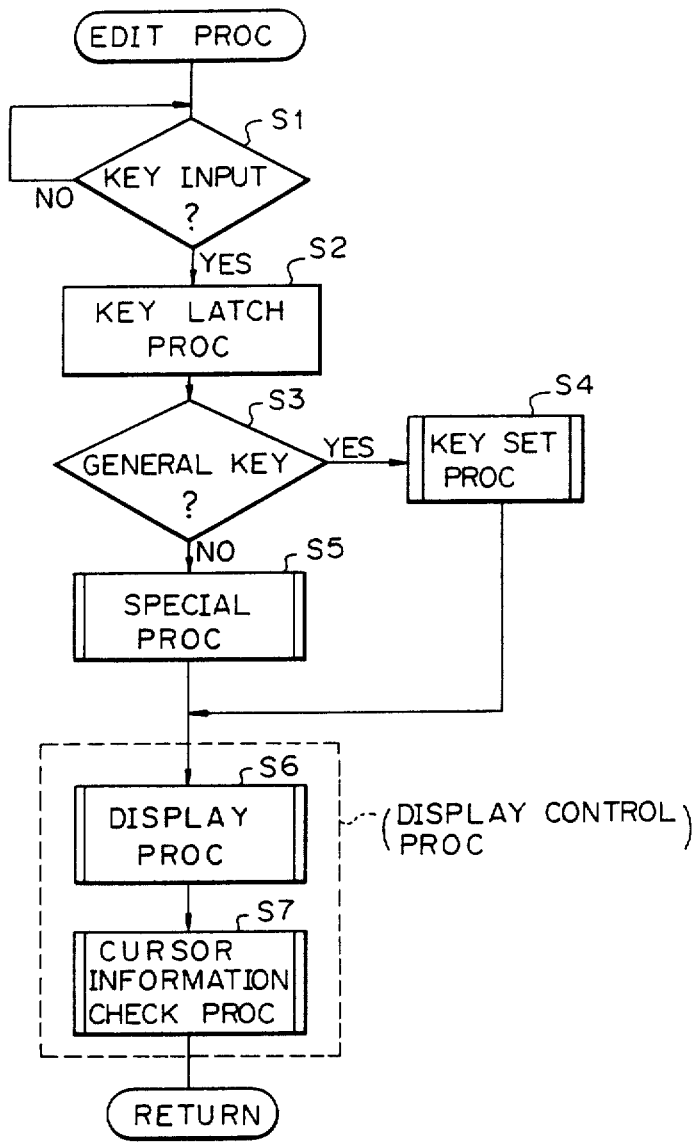
FIG. 20 is a flow chart showing an entire editing process.

FIG. 20 shows an entire procedure when one of the keys in the keyboard KB is depressed, and the foregoing or other character processes for text preparation or editing are realized by repeating said procedure.

At first, a step S1 awaits a key input from the keyboard KB, and, in response to the actuation of any key, a step S2 effects a key latch process to obtain a key code corresponding to the actuated key, and a step S3 discriminates whether said key code belongs to the general keys KB1, shown in FIG. 2.

If the key code belongs to the general keys KB1, a step S4 effects a key set process, in which said key code is set in the buffer memory DB according to the cursor position set on the display screen.

On the other hand, if said key code belongs to the special keys KB2 (FIG. 2), the program proceeds to a step S5 to effect a special process corresponding to said key code. For example, if said special key is the IND key, a special code, indicating the setting or ending of indentation, is set in the buffer memory DB corresponding to the cursor position. The details of such process will be explained later in reference to ensuing flow charts. When the content of the buffer memory DB is changed by the above-explained key set process or special process, a step S6 executes a display process to display the content of said buffer memory DB on the display unit CRT, and a step S7 executes a cursor information check process. In this manner the process for a key actuation is completed, and the program returns to the step S1 to await a succeeding key input.

In the following description there will be given detailed explanations on the special processes in the step S5 shown in FIG. 20, while making reference to flow charts starting from FIG. 21.

Figure 21:
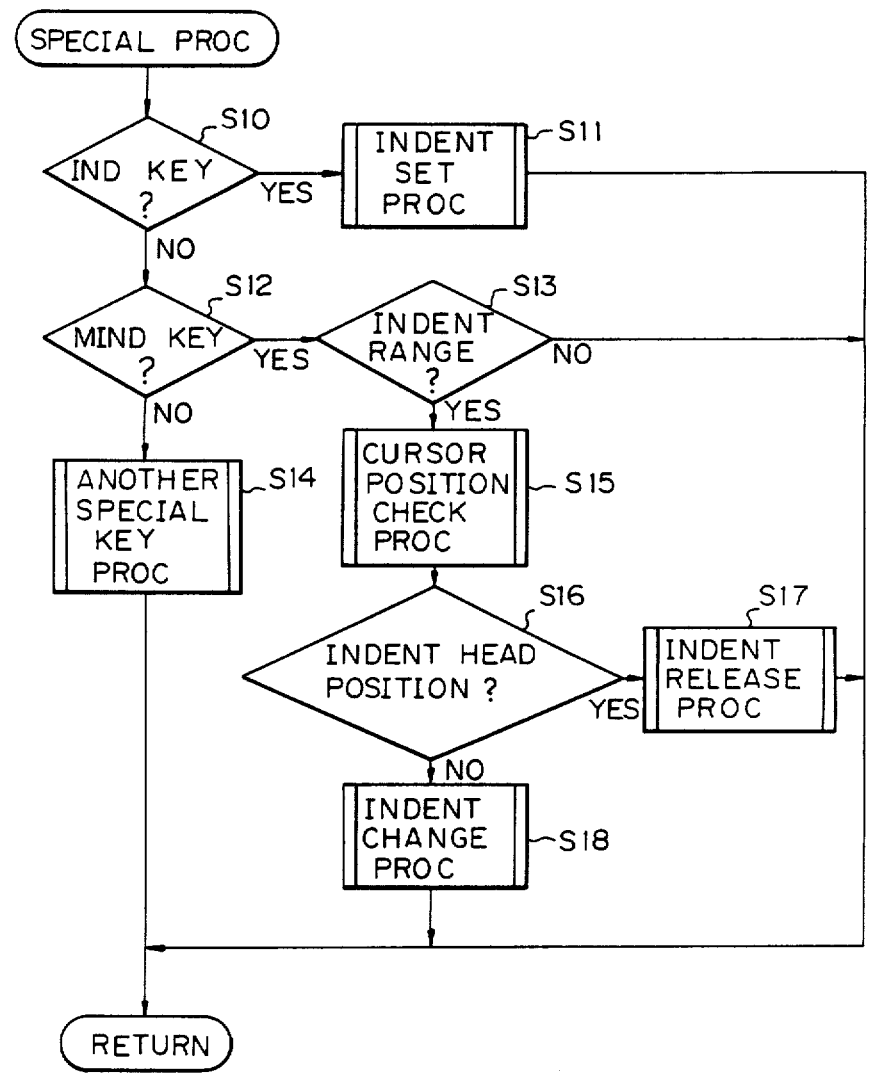
FIG. 21 is a flow chart showing an entire special process.

FIG. 21 shows an entire special process, which is not related to the indentation, but is related to various editing processes such as insertion or deletion of a character, though another special process step S14 will not be explained in detail. At first, a step S10 discriminates whether the IND key has been depressed, and, if so, the program proceeds to a step S11 for an indent setting process which will be explained later in relation to FIG. 22. Otherwise, the program proceeds to a step S12 to discriminate whether the MIND key has been depressed. If so, the program proceeds to a step S13, in which there is identified the flag set in the register INF-ID of the cursor position display registers DSR-INF, indicating the amount of aberration between the actual cursor position on the display screen and the corresponding position in the buffer memory DB. If said INF-ID is equal to "0", the program proceeds, from the step S13, along a branch "no" to return to the start without any process. On the other hand, if the INF-ID is equal to "1," indicating that the cursor is in the range of indentation, the program proceeds to steps S15, S16 for checking the cursor position and discriminating whether the cursor is at the indent start position. If the cursor is at the indent start position, the program proceeds to a step S17 for an indent releasing step which will be explained later in further detail in relation to FIG. 24. If not there is executed an indent modifying step S18 which will be explained later in relation to FIG. 25.

The special key process for special keys, including the IND key, is completed and the program returns to the main routine.

Figure 22:
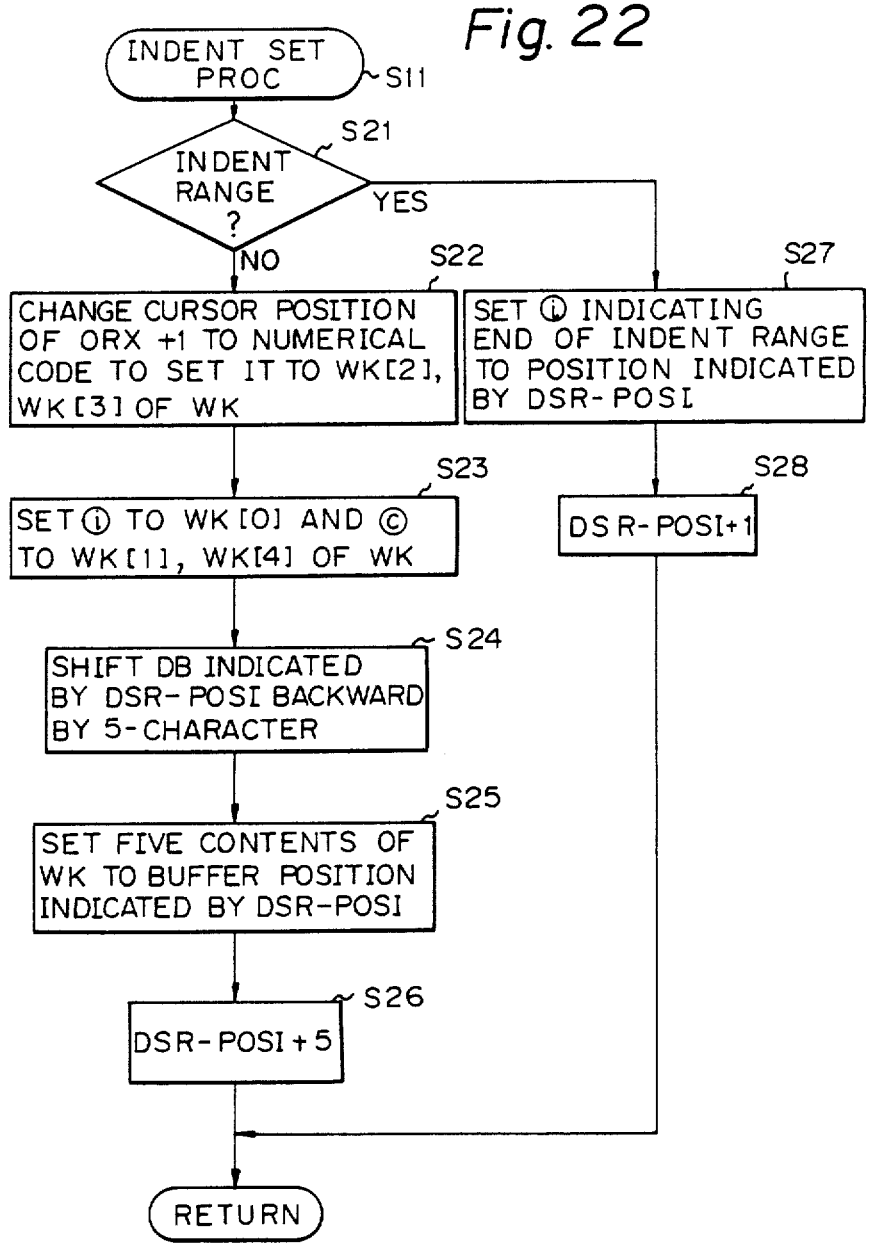
FIG. 22 is a flow chart showing an indent setting process.

FIG. 22 is a flow chart showing the detail of the indent setting process in the above-explained step S11.

At first, a step S21 identifies if the cursor is in the range of indentation, in the same manner as in the step S13 shown in FIG. 21. If the cursor is not in the range of indentation, the program proceeds to steps S22-S26 to set a special code for starting indentation. On the other hand, if the cursor is in the range of indentation, the program proceeds to steps S27, S28 for setting a special code for ending indentation.

Figure 26:
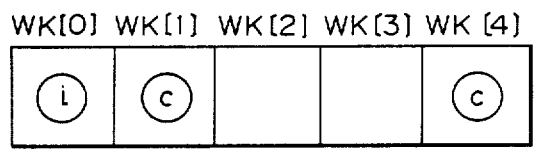
FIG. 26 is a schematic view showing the structure of a work buffer.

The steps S22 to S26 for starting an indentation will be explained first. The steps S22 and S23 prepares a train of special codes required for starting an indentation, in work buffers WK [0]-WK[4] shown in FIG. 26. The step S22 adds "1" to the x-coordinate of the cursor indicated by the register CR-X to obtain the indent start column position, and converts thus obtained number into a numeral code of two digits, for example "10" in case of FIG.7. The details of said conversion will not be explained. Thus converted numeral code is set in the work buffers WK[2] and WK[3] which are shown in FIG. 26. Then the step S23 sets the indentation special code [i] and the special codes [c], [c] indicating the column position, respectively, in the work buffers WK[0], WK[1] and WK[4]. Then the step S24 shifts, in the backward direction, the position in the buffer memory, which is indicated by the buffer-cursor position register DSR-POSI. In this case, a shift of 5 characters is set in the work buffers WK. Said work buffers can be considered a part of the work buffer memory. Thus the code [eof] is shifted by 5 characters from DB[16], shown in FIG. 8B, to DB[21]. Said shift of 5 characters in the buffer memory DB secures an area for the train of characters prepared in the steps S22 and S23. The step S25 sets the content of the work buffer WK in said area secured in the buffer memory DB. Then the step S26 adds "5" to the buffer-cursor position register for moving the cursor to the EOF position at which a next character input is to be carried out. In this manner, the steps S22-S26 effect a preparatory process for starting character inputs with indentation, and the characters entered thereafter are processed with thus instructed indentation until the indentation is terminated by the actuation of the IND key again. FIG. 8D shows the state of the buffer memory DB after said steps S22-S26. Thereafter, the character inputs are effected with indentation as shown in FIG. 8F.

In the case of terminating the input of characters with indentation, an indent ending process is effected by the actuation of the IND key again. Said ending process, consisting of the steps S27 and S28, is executed, when the step S21 discriminates that the cursor is in the range of indentation, by setting the special code [i] for closing the indent range initiated by the code [i]. The range of indentation is closed by setting the special code [i] at a position, in the buffer memory DB, indicated by the buffer-cursor position register DSR-POSI. Then the step S28 adds "1" to the buffer-cursor position register DSR-POSI to bring the cursor to a next position.

Figure 23:
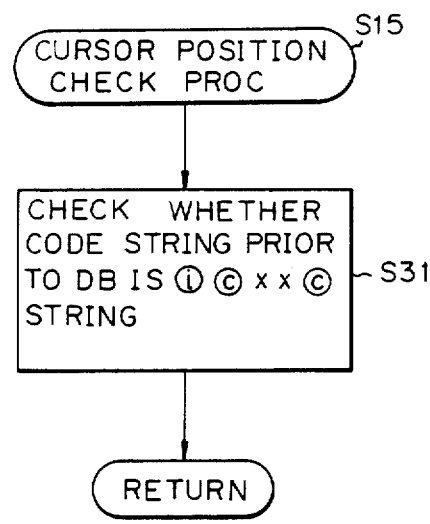
FIG. 23 is a flow chart showing a cursor position checking process.

FIG. 23 is a detailed flow chart of the cursor position check process in the step S15, shown in FIG. 21, for discriminating whether the cursor position, indicated by the buffer-cursor position register DSR-POSI, is at the indent start position in the range of indentation. This is done by identifying whether a preceding character in a buffer memory position, indicated by the buffer-cursor position register, is an indent code [i] or indent column codes [c]xx [c]. If said codes, [i] are [c]xx[c], are set in the buffer memory DB preceding the position indicated by the buffer-cursor position register DSR-POSI, then the present cursor position is at the indent start position.

Figure 24:
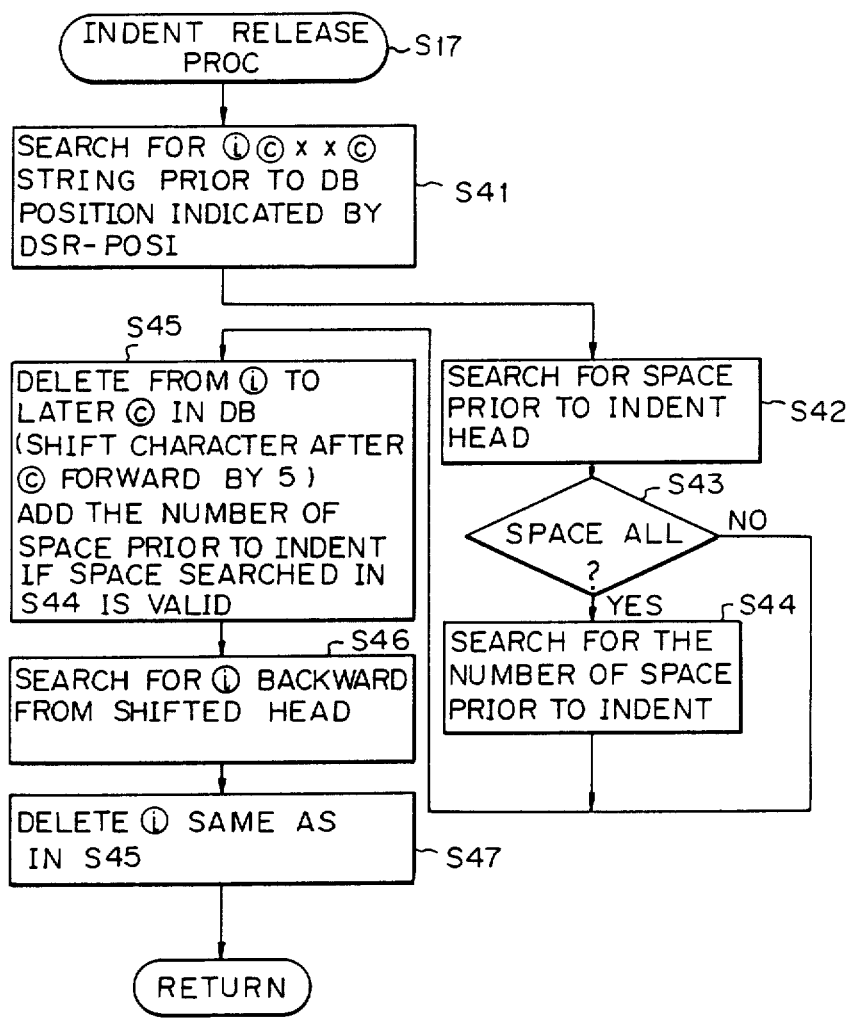
FIG. 24 is a flow chart showing an indent releasing process.

Now reference is made to a detailed flow chart shown in FIG. 24, showing the indent releasing step S17 in FIG. 21. FIGS. 14 and 16 show the state of the display after the indentation is terminated. Said indent releasing step deletes the indent special codes [i] and [c] from the buffer memory, as shown in FIGS. 15 and 17. In the following description, the flow chart shown in FIG. 24 will be explained. A step S41 searches for the indent special code [i] and indent column special codes [c]xx [c], in the buffer memory DB, preceding a position indicated by the buffer-cursor position register DSR-POSI. then a step S42 identifies whether the characters preceding said special codes [i], [c]xx [c], in the indent start line, are all spaces, and, if so, a step S44 searches and counts a number of said spaces in order to delete the same when the indentation is released. A step S45 then deletes the number of characters searched in said steps S42 and S44, by shifting the buffer memory by the number of characters searched in said steps S42 and S44, whereby the indent special codes [i] [c]xx [c], are deleted from the buffer memory DB. Then, in order to delete the indent closing special code [i], said code is searched for from the start position in the buffer memory DB, which was shifted in the step S45. Said indent closing special code [i] is then deleted from the buffer memory DB by a shift/ by a character corresponding to thus searched code [i], as in the step S45. The steps S41-S47 then easily releases the indentation as shown in FIGS. 14 and 16.

Figure 25:
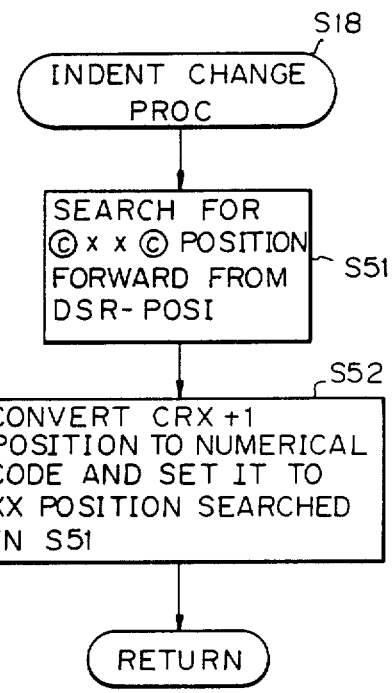
FIG. 25 is a flow chart showing an indent modifying process.

Now reference is made to FIG. 25 showing the details of the indent modifying procedure in the step S18 shown in FIG. 21. In the present embodiment, the indentation can be modified by a change in the indent column special code as shown in FIG. 18. With an original text as shown in FIG. 6, the cursor is moved to a column position to which the indentation is to be changed. If said column position is not the indent start position, the indentation is modified (steps S16, S18 in FIG. 26) to this new column position. FIG. 18 shows a state of the display in which the original indentation at the 10th column is modified to the 15th column, and FIG. 19 shows the corresponding state of the buffer memory DB, in which the original special codes [i][c]10[c] shown in FIG. 10 is modified to [i][c]15[c].

Now reference is made to FIG. 25. At first, a step S51 searches the special codes [i][c]xx[c] in the forward direction from the position indicated by the buffer-cursor position register DSR-POSI, and a step S52 sets a new cursor position by changing the numeral, for example, from 10 to 15, in the positions represented by xx. In this manner, the indent column position is modified to a new position, and the display is effected with thus modified indent position.

Figure 27A:
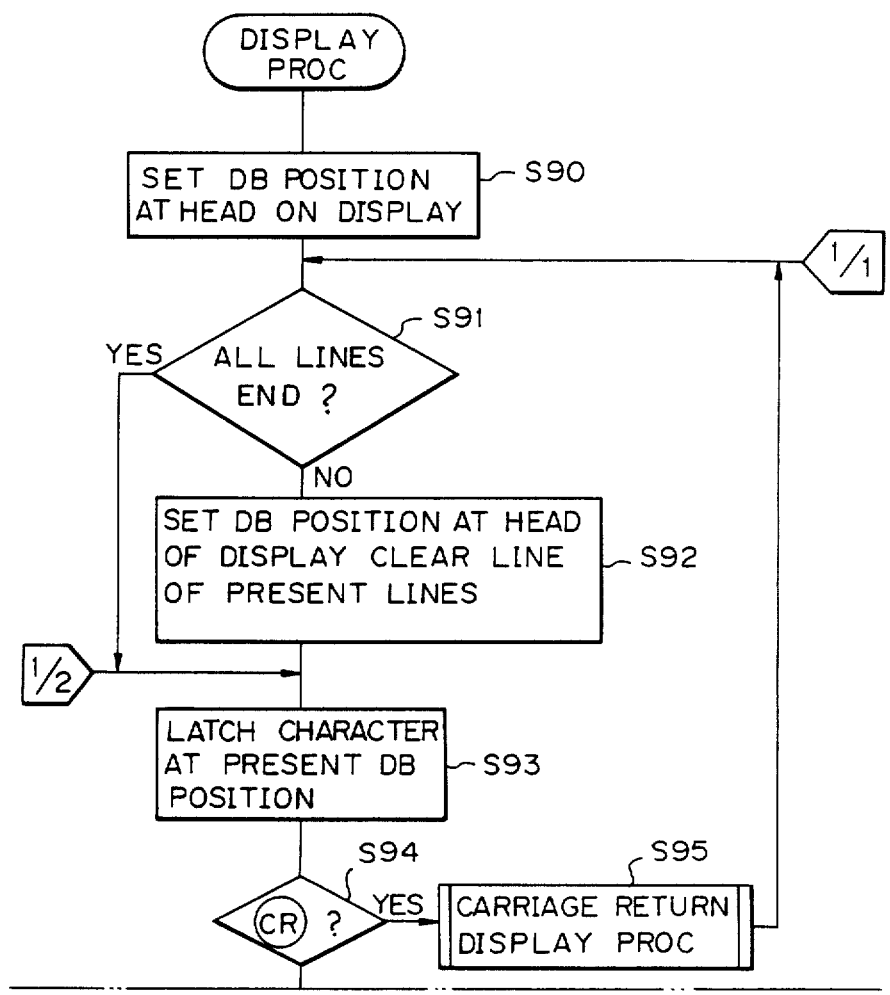
FIGS. 27A and 27B are assembled to form a flow chart showing a display process.
Figure 27B:
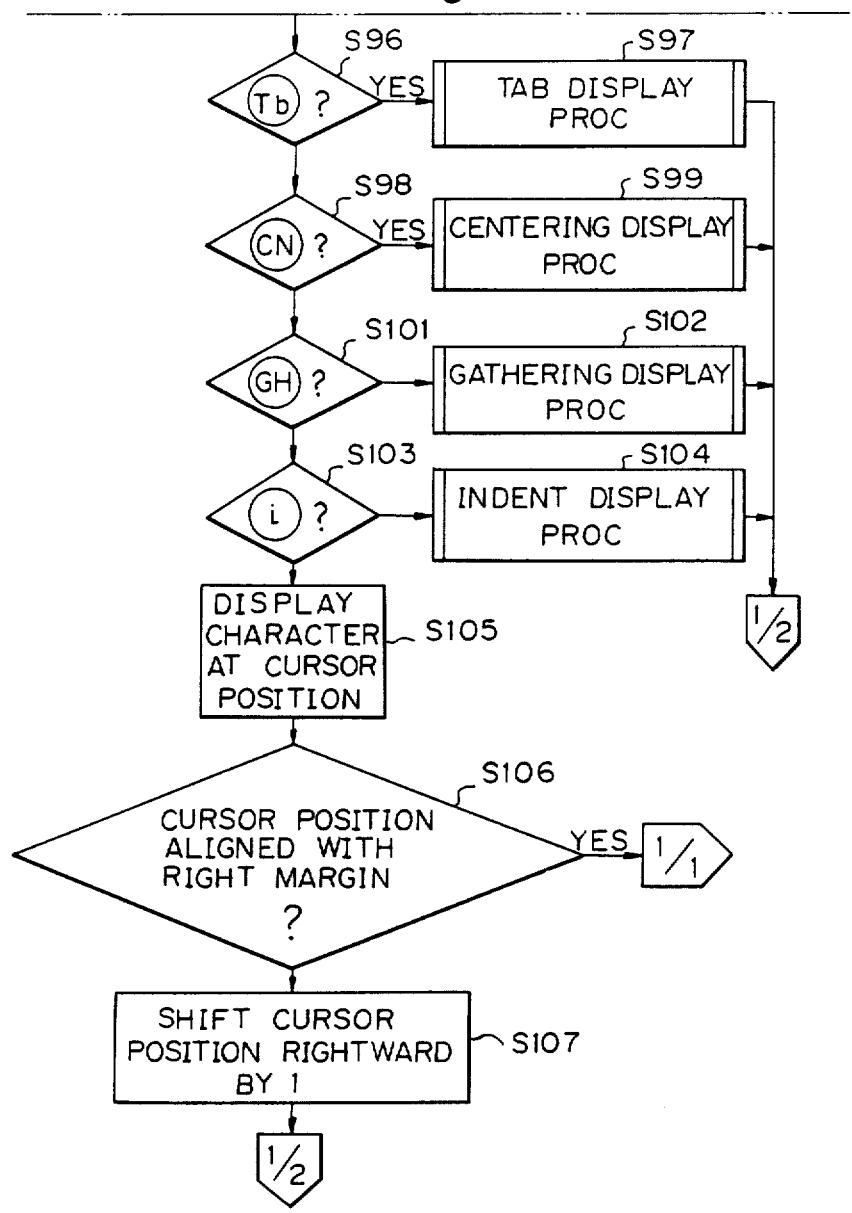
Figure 28C:
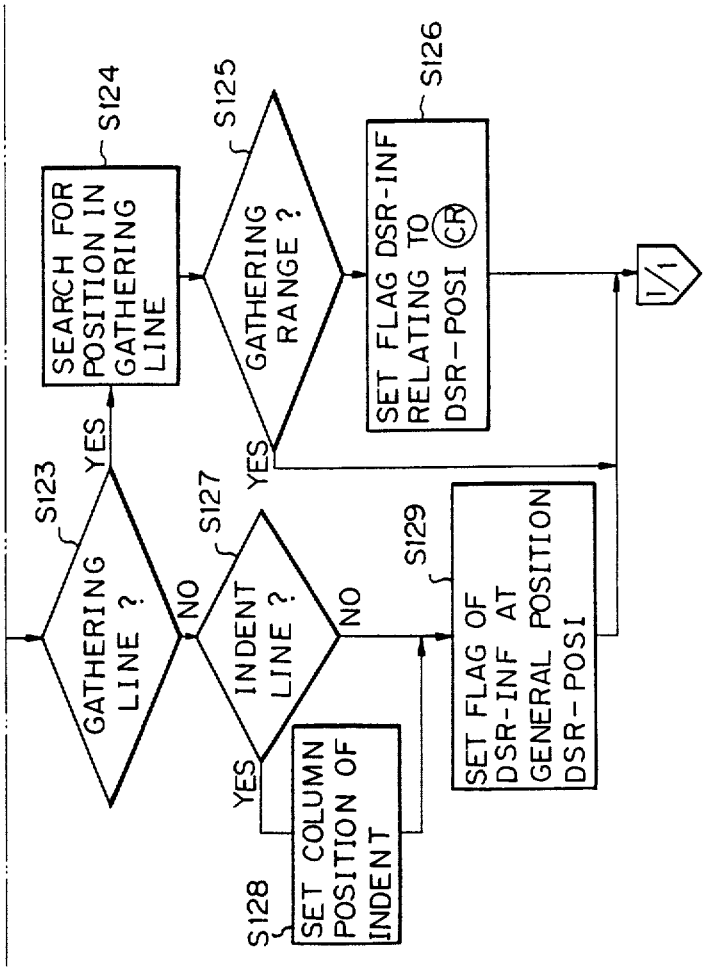

FIG. 27 shows the relationship between FIGS. 27A and 27B, where FIGS. 27A and 27B show the details of the display process shown in the step S6 in FIG. 20. FIG. 28 shows the relationship among FIGS. 28A, 28B and 28C, where FIGS. 28A, 28B and 28C show the details of the cursor information check process shown in the step S7 in FIG. 26. Such display process and cursor information check process are based on already known technology and will not be explained in detail as they are not directly related to the present invention. In the foregoing embodiment, an indent special code [i] and an indent position special code [c] are used, but other codes may be used so long as they can be identified. Also, the number of columns is not limited to two digits.

As explained in the foregoing, the present invention provides the advantages that:

(a) editing is rendered possible for the characters preceding the indent start position;

(b) characters preceding the indent start position can be modified regardless of the indent setting column position;

(c) at the release of indentation, the characters preceding the indent start position are all deleted if said characters are all spaces, but they are not deleted if they are not all spaces, so that the indentation can be released in a form matching the needs of the operator; and (d) the position of indentation can be freely modified by a modifying process; thereby enabling a more effective indentation process.

More specifically, the present invention provides a word processor comprising character input means for entering a determined indent code and character codes; memory means for storing said indent code and ensuing character codes, entered by said input means, in consecutive addresses; display means for displaying, on a screen, characters sandwiched between a pair of said indent codes; and input control means for enabling the input and editing of characters in positions preceding an indent position designated by said indent code. Also, there is provided a word processor further comprising means for releasing an already set indentation, said means being adapted to automatically delete spaces preceding the indent start position at the release of said indentation.

Furthermore, there is provided a word processor in which the indent position is variable according to the input or editing of characters in positions preceding the indent position designated by said indent code.

Furthermore, there is provided a word processor comprising means for modifying an already set indentation, wherein said means is adapted to modify the indentation to a newly designated indent position.

What is claimed is

1. A text processing apparatus or word processor comprising:
input means for entering character data;
indent input means for entering indent data;
memory means, connected to said input means and said indent input means, for storing the character data from said input means and the indent data from said indent input means;
indent modifying means, connected to said memory means, for modifying a position of the indent data stored in said memory means; and
control means, connected to said memory means and said indent modifying means, for modifying the data stored in said memory means according to the position of the indent data as modified by said indent modifying means.

2. A text processing apparatus or word processor according to claim 1, further comprising display means, connected to said control means and said memory means, for visibly displaying the data stored in said memory means.

3. A text processing apparatus or word processor comprising:
input means for entering character data;
indent input means for entering indent data;
memory means, connected to said input means and said indent input means, for storing the data entered by said input means and said indent input means; and
input control means, connected to said input means, said indent input means, and said memory means, for correcting or editing the character data in positions preceding said indent data in said memory means.

4. A text processing apparatus or word processor according to claim 3, further comprising control means, connected to said memory means and said input control means, for renewing the indent data when said character data are modified or edited by said input control means.

5. A text processing apparatus or word processor according to claim 3, further comprising display means, connected to said memory means, said input control means, and said control means, for displaying the character data stored in said memory means.

6. A text processing apparatus or word processor comprising:
input means for entering character data;
indent input means for entering indent data;
memory means, connected to said input means and said indent input means, for storing the data entered by said input means and said indent input means;
indent releasing means, connected to said memory means, for releasing the indent data stored in said memory means; and
control means, connected to said memory means and said indent releasing means, for deleting space areas preceding the indent data in said memory means to be released by said indent releasing means.

7. A text processing apparatus or word processor according to claim 6, wherein said control means deletes the space areas only when no character data, other than spaces, are included in the data which precedes said indent data in said memory means.

8. A text processing apparatus or word processor according to claim 6, further comprising display means, connected to said memory means and said control means, for displaying the character data stored in said memory means.

9. A text processing apparatus or word processor comprising:
input means for entering character data;
special data input means for entering first special data and second special data corresponding to said first special data;
memory means, connected to said input means and said special data input means, for sorting the character data entered by said input means and the first and the second special data entered by said special data input means;

instruction means, connected to said memory means, for instructing deletion of the first special data stored in said memory means; and control means, connected to said memory means and said instruction means, for deleting the first special data and the second special data corresponding to said first special data, when deletion is instructed by said instruction means.

10. A text processing apparatus or word processor according to claim 9, wherein said first and said second special data are indent data.

11. A text processing apparatus or word processor according to claim 9, wherein said control means, in the presence of plural sets of said first and said second special data, deletes second special data immediately following first special data when deletion of said first special data is instructed.

12. A text processing apparatus or word processor according to claim 9, further comprising display means, connected to said memory means and said control means, for displaying the character data stored in said memory means.

13. A text processing apparatus or word processor comprising:

input means for entering character data;

indent input means for entering indent data;

display means, connected to said input means, for displaying the character data entered by said input means; and control means, connected to said input means, said indent input means, and said display means, for aligning the display, after the entry of said indent data by said indent input means, of a start position of following lines of characters which are entered thereafter by said input means to a column at which said indent data are entered.

14. A text processing apparatus or word processor according to claim 13, wherein the indent data entered by said indent input means are stored together with a column position at which said entry is effected.

15. A text processing apparatus or word processor according to claim 13, wherein said control means aligns the display, when a modification or an editing is conducted in an indent start line, of a start position of following lines at an initially set indent column position.

16. A text processing apparatus or word processor according to claim 13, further comprising second control means, connected to said display means and said control means, for deleting space areas preceding the indent data when said indent data are deleted.

17. A text processing apparatus or word processor comprising:

input means for entering character data;

indent input means for entering indent data;

display means, connected to said input means, for displaying a cursor and character data entered by said input means;

display control means, connected to said input means, said indent input means, and said display means, for aligning the display, when said indent data are entered by said indent input means, of a start position of following lines of characters which are entered thereafter at a column position of the cursor at said entry of indent data; and second display control means, connected to said indent input means, said display means, and said display control means, for aligning the display, when characters are inserted in positions preceding the indent start position in an indent start line, of the start position of following lines at an initially set indent column position.

* * * * *

UNITED STATES PATENT AND TRADEMARK OFFICE
CERTIFICATE OF CORRECTION

PATENT NO. : 4,862,410

DATED : August 29, 1989

INVENTOR(S) : Koji Fukunaga

It is certified that error appears in the above-identified patent and that said Letters Patent is hereby corrected as shown below:

[57] AT ABSTRACT
   Line 16, change "iden" to --inden--.
   Line 17, change "tiation" to --tation--.

COLUMN 1
   Line 11, change "such the" to --such as the--.

COLUMN 4
   Line 45, change "sists" to --sist--.
   Line 54, change "cates" to --cate--.

COLUMN 5
   Line 51, change "FML" to --FML,---.
   Line 53, change "displayed" to --displayed by--.
   Line 53, change the type style of "The value of the register" from italics to Roman.
   Line 54, change the type style of "CR-X, indicating the x-coordinate of the cursor CR, is equal to" from italics to Roman.

UNITED STATES PATENT AND TRADEMARK OFFICE
CERTIFICATE OF CORRECTION

PATENT NO. : 4,862,410

DATED : August 29, 1989

INVENTOR(S) : Koji Fukunaga

It is certified that error appears in the above-identified patent and that said Letters Patent is hereby corrected as shown below:

COLUMN 6
    Line 43, change "indent setting position" " " to --indent setting position " $\wedge$ "--.

COLUMN 9
    Line 26, change "prepares" to --prepare--.
    Line 55, change "inputs" to --input--.

COLUMN 10
    Line 14, change "are" (first occurrence) to --or--.
    Line 37, change "indent special codes [i][c]xx[c]," to --indent special codes [i],[c]xx[c],--.
    Line 43, change "shift/" to --shift--.
    Line 45, change "releases" to --release--.
    Line 61, change "is modified" to --are modified--.

COLUMN 12
    Line 68, change "sorting" to --storing--.

Signed and Sealed this

Eighteenth Day of December, 1990

Attest:

HARRY F. MANBECK, JR.

*Attesting Officer*

*Commissioner of Patents and Trademarks*